United States Patent
Peng

(10) Patent No.: US 6,738,766 B2
(45) Date of Patent: May 18, 2004

(54) APPARATUS AND METHODS FOR PROVIDING PERSONALIZED APPLICATION SEARCH RESULTS FOR WIRELESS DEVICES BASED ON USER PROFILES

(75) Inventor: Luosheng Peng, San Jose, CA (US)

(73) Assignee: DoOnGo Technologies, Inc., Alviso, CA (US)

( * ) Notice: Subject to any disclaimer, the term of this patent is extended or adjusted under 35 U.S.C. 154(b) by 235 days.

(21) Appl. No.: 09/776,593

(22) Filed: Feb. 1, 2001

(65) Prior Publication Data

US 2001/0047363 A1 Nov. 29, 2001

Related U.S. Application Data

(60) Provisional application No. 60/179,761, filed on Feb. 2, 2000.

(51) Int. Cl.[7] ............................................... G06F 17/30
(52) U.S. Cl. ..................... 707/6; 707/2; 707/4; 707/5; 707/10
(58) Field of Search ................................. 709/202, 105, 709/217, 219, 200, 205, 227, 203, 206, 225, 226, 229, 238, 245, 250; 707/104, 203, 2, 3, 4, 5, 103, 1, 6, 10, 101, 103 R, 104.1, 201; 705/7, 14, 18, 26, 27, 28, 38

(56) References Cited

U.S. PATENT DOCUMENTS

| | | |
|---|---|---|
| 5,491,800 A | 2/1996 | Goldsmith et al. |
| 5,613,108 A | 3/1997 | Morikawa |
| 5,632,018 A | 5/1997 | Otorii |
| 5,771,355 A | 6/1998 | Kuzma |
| 5,815,663 A | 9/1998 | Uomini |
| 5,835,727 A | 11/1998 | Wong et al. |
| 5,835,911 A | 11/1998 | Nakagawa et al. |
| 5,887,254 A | 3/1999 | Halonen |
| 5,903,723 A | 5/1999 | Beck et al. |
| 5,926,624 A | 7/1999 | Katz et al. |
| 5,999,932 A | 12/1999 | Paul |
| 6,105,063 A | 8/2000 | Hayes, Jr. |
| 6,169,909 B1 | 1/2001 | Koshino |
| 6,170,060 B1 | 1/2001 | Mott et al. |
| 6,173,311 B1 * | 1/2001 | Hassett et al. ............... 709/202 |
| 6,199,076 B1 | 3/2001 | Logan et al. |
| 6,493,742 B1 * | 12/2002 | Holland et al. ............. 709/200 |

OTHER PUBLICATIONS

U.S. patent application Ser. No. 09/776,165, filed Feb. 1, 2001; "Apparatus and Methods For Optimizing Traffic Volume in Wireless Email Communications"; Inventor Luosheng Peng.

U.S. patent application Ser. No. 09/776,594, filed Feb. 1, 2001; "Apparatus and Methods For Providing Coordinated and Personalized Application and Data Management for Resource–Limited Mobile Devices"; Inventor: Luosheng Peng.

U.S. patent application Ser. No. 09/776,598, filed Feb. 1, 2001; "Apparatus and Methods For Providing Data Synchronization by Facilitating Synchronization System Design"; Inventor: Luosheng *Peng*.

* cited by examiner

Primary Examiner—Shahid Alam
Assistant Examiner—Fred Ehichioya
(74) Attorney, Agent, or Firm—Law Office of Roxana H. Yang

(57) ABSTRACT

An exemplary method for providing personalized application search results in a mobile device comprises the steps of receiving a search request from a user, the search request including at least one search keyword and a user identifier, searching an application registry database for a first set of matching applications based on the search keyword, searching an application selection table for a second set of matching applications based on the search keyword and the user identifier, ordering the second set of matching applications based on frequency of use parameters in the application selection table to obtain an ordered second set of matching applications, appending a set of application in the first set of matching applications but not in the second set of matching applications to the end of the ordered second set of matching applications, generating a response to the search request based on the third set of matching applications, and sending the response to the user.

6 Claims, 13 Drawing Sheets

218

| Apps / Parameter | App #1 | App #2 | App #3 | ... |
|---|---|---|---|---|
| Keywords | "game" | "MP3 player" | "email client" | ... |
| Name | "http//www.doongo.com/app/cgi/appserv?appname = prokyman" | "http//www.doongo.com/app/cgi/appserv?appname = musicplayer" | "http//www.doongo.com/app/cgi/appserv?appname = emailprg" | ... |
| nExec | 17 | 3 | 7 | ... |
| lastExec Time | Fri, 25 Feb '00 9:08:11 | Thu, 24 Feb '00 22:03:01 | Fri, 25 Feb '00 13:12:19 | ... |
| ... | ... | ... | ... | ... |

326

| Apps / Parameter | App #1 | App #2 | App #3 | ... |
|---|---|---|---|---|
| Keywords | "game, porkyman" | "music, MP3, MP3player, music player, online music" | "email, wireless email, email client, email program, multimedia" | ... |
| Name | "http//www.doongo.com/app/cgi/appserv?appname = prokyman" | "http//www.doongo.com/app/cgi/appserv?appname = musicplayer" | "http//www.doongo.com/app/cgi/appserv?appname = emailprg" | ... |
| SubID | 9901 | 9902 | 9903 | ... |
| Description | "Porkyman game is fantastic. The game is Free now." | "musicplayer" | | ... |
| nExec | 17 | 3 | 7 | ... |
| lastExec Time | Fri, 25 Feb '00 9:08:11 | Thu, 24 Feb '00 22:03:01 | Fri, 25 Feb '00 13:12:19 | ... |
| ... | ... | ... | ... | ... |

FIG. 3B

APPARATUS AND METHODS FOR PROVIDING PERSONALIZED APPLICATION SEARCH RESULTS FOR WIRELESS DEVICES BASED ON USER PROFILES

RELATED APPLICATIONS

This application claims priority to the provisional application entitled "Data Synchronization System Modeling and Optimization for Support of Disconnected Operation and High Data Availability," filed on Feb. 2, 2000, and bearing the Ser. No. 60/179,761.

This application is also related to applications entitled "Apparatus and Methods for Providing Data Synchronization by Facilitating Data Synchronization System Design," "Apparatus and Methods for Optimizing Traffic Volume of Wireless Email Communications," and "Apparatus and Methods for Providing Coordinated and Personalized Application and Data Management for Resource-Limited Mobile Devices," bearing Ser. Nos. 09/776,598, 09/776,165, and 09/776,594, respectively. These applications were filed on Feb. 1, 2001 and all claimed priority to the above provisional application bearing Ser. No. 60/179,761.

FIELD OF THE INVENTION

This invention relates to apparatus and methods for providing personalized application search results in a wireless device. In particular, this invention relates to apparatus and methods for providing personalized application search results based on user profiles.

BACKGROUND OF THE INVENTION

Computer devices connected by a network are typically capable of sharing information. In a world wide network, such as the Internet, client computers or devices connected to the network are capable of accessing information stored in virtually any server computers connected to the network. Many modern server computers provide rich media that are accessible across the Internet. Examples of rich media are audio, video, image, software, applications, games, data, and other multimedia information.

Typically, transmission of rich media across the Internet requires a wide bandwidth. Further, the cost and efficiency for a user to retrieve rich media is dependent on the capacity of the user's computer or device. Partly due to size constraints, most existing wireless/mobile devices do not have the capacity to effectively retrieve rich media. In particular, most wireless/mobile devices have very limited memory space for caching and inadequate processing capability for retrieving complex objects.

Generally, wireless/mobile devices include a user interface, such as a micro-browser, pre-installed on a wireless/mobile device and a set of fixed applications and hierarchical menus for Internet access. Using the micro-browser, a user typically browses the Internet using the fixed menus or by manually entering specific uniform resource locators (URLs). Such fixed menus are not tailored to a user's preferences.

Through the micro-browser, a user typically performs a search for an application or data on a network by entering keywords into an input area. Based on the keywords, a search engine, which typically resides on the gateway, performs a search and returns a set of search results. Often, hundreds or thousands of search results are returned. The user then has the option of narrowing the search by entering more keywords or browsing through the entire search results for the application or data set he/she is looking for. This latter option is especially problematic in wireless/mobile devices where the output device (e.g., screen) and working memory are typically small and connection to the network is costly. Further, existing search engines do not take into account personal preferences by each user. At a given time, different users entering the same set of keywords will get identical search results.

Thus, it is desirable to provide apparatus and methods for providing personalized application search results in a mobile device.

SUMMARY OF THE INVENTION

An exemplary method for providing personalized application search results in a mobile device comprises the steps of receiving a search request from a user, the search request including at least one search keyword and a user identifier, searching an application registration database for a first set of matching applications based on the search keyword, searching an application selection table for a second set of matching applications based on the search keyword and the user identifier, ordering the second set of matching applications based on frequency of use parameters in the application selection table to obtained an ordered second set of matching applications, appending a set of applications that are included in the first set of matching applications but not included the second set of matching applications to the end of the ordered second set of matching applications to obtain a third set of matching applications, generating a response to the search request based on the third set of matching applications, and sending the response to the user.

In one embodiment, the exemplary method further comprises the steps of collecting application registration information for each application and storing the application registration information in the application registry database. In an exemplary embodiment, the application registration information includes: a uniform resource locator, a brief description, and at least one associated keyword.

In another embodiment, the exemplary method further comprises the steps of receiving application selection records from the user and storing the application selection records in the application selection table. In an exemplary embodiment, each of the application selection records includes a uniform resource locator, at least one associated keyword, parameter values indicating a frequency of use, and a time stamp indicating a last use of the application. In one embodiment, the associated keyword is provided by a user for having been successful in searching the application.

Another exemplary method for providing personalized search results in a mobile device comprises the steps of receiving a set of keywords from a user, searching an application selection table for a first set of applications matching the set of keywords, examining a local file system to locate each of the first set of applications, generating a second set of applications including applications located in the local file system based on the examining, and displaying the second set of applications to the user.

In one embodiment, the exemplary method further comprises the steps of receiving a user selection of an application from a set of displayed applications, loading and executing the application, and updating the application selection table based on the user selection. In another embodiment, the exemplary method further comprises the steps of sending a set of application selection records from the application selection table to a gateway, receiving an acknowledgment from the gateway, and removing the set of application selection records from the application selection table.

An exemplary computer program product for providing personalized application search results in a mobile device comprises logic code for receiving a search request from a user, the search request including at least one search keyword and a user identifier, logic code for searching an application registry database for a first set of matching applications based on the search keyword, logic code for searching an application selection table for a second set of matching applications based on the search keyword and the user identifier, logic code for ordering the second set of matching applications based on frequency of use parameters in the application selection table to obtain an ordered second set of matching applications, logic code for appending a set of applications that are included in the first set of matching applications but not included in the second set of matching applications to the end of the ordered second set of matching aplications to obtain a third set of matching applications, logic code for generating a response to the search request based on the third set of matching applications, and logic code for sending the response to the user.

In one embodiment, the exemplary computer program product further comprises logic code for collecting application registration information for each application and logic code for storing the application registration information in the application registry database. In an exemplary embodiment, the application registration information includes: a uniform resource locator, a brief description, and at least one associated keyword.

In another embodiment, the exemplary computer program product further comprises logic code for receiving application selection records from the user and logic code for storing the application selection records in the application selection table. In an exemplary embodiment, each of the application selection records includes: a uniform resource locator, at least one associated keyword, parameter values indicating a frequency of use, and a time stamp indicatin a last use of the application.

Another exemplary computer program product for providing personalized search results in a mobile device comprises logic code for receiving a set of keywords from a user, logic code for searching an application selection table for a first set of applications matching the set of keywords, logic code for examining a local file system to locate each of the first set of applications, logic code for generating a second set of applications including applications located in the local system based on the examining, and logic code for displaying the second set of applications to the user.

In one embodiment, the exemplary computer program product further comprises logic code for receiving a user selection of an application from a set of displayed applications, logic code for loading and executing the application, and logic code for updating the application selection table based on the user selection. In another embodiment, the exemplary computer program product further comprises logic code for sending a set of application selection records from the application selection table to a gateway, logic code for receiving an acknowledgment from the gateway, and logic code for removing the set of application selection records from the application selection table.

BRIEF DESCRIPTION OF THE DRAWINGS

FIG. 3B schematically illustrates an exemplary application selection table maintained in a gateway in accordance with an embodiment of the invention.

DETAILED DESCRIPTION OF THE INVENTION

Figure 1:
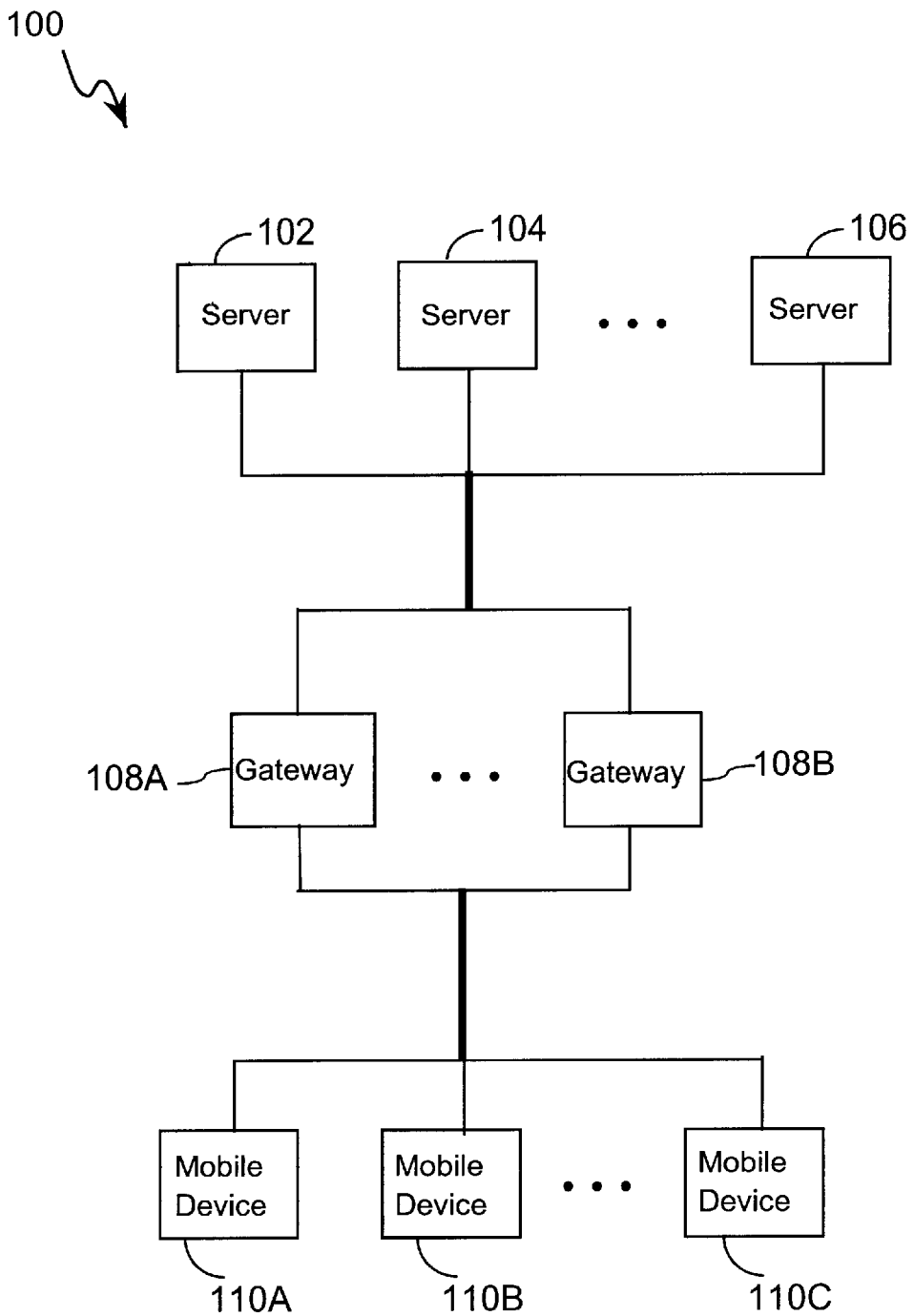
FIG. 1 schematically illustrates an exemplary system in accordance with an embodiment of the invention.

FIG. 1 illustrates an exemplary prior art system 100. The system 100 includes multiple servers connected to multiple gateways that service multiple mobile devices. For ease of explanation, only a representative number of servers, gateways, and mobile devices are shown in FIG. 1. The system 100 includes servers 102–106, gateways 108A–108B, and mobile devices 110A–110C.

Figure 2A:
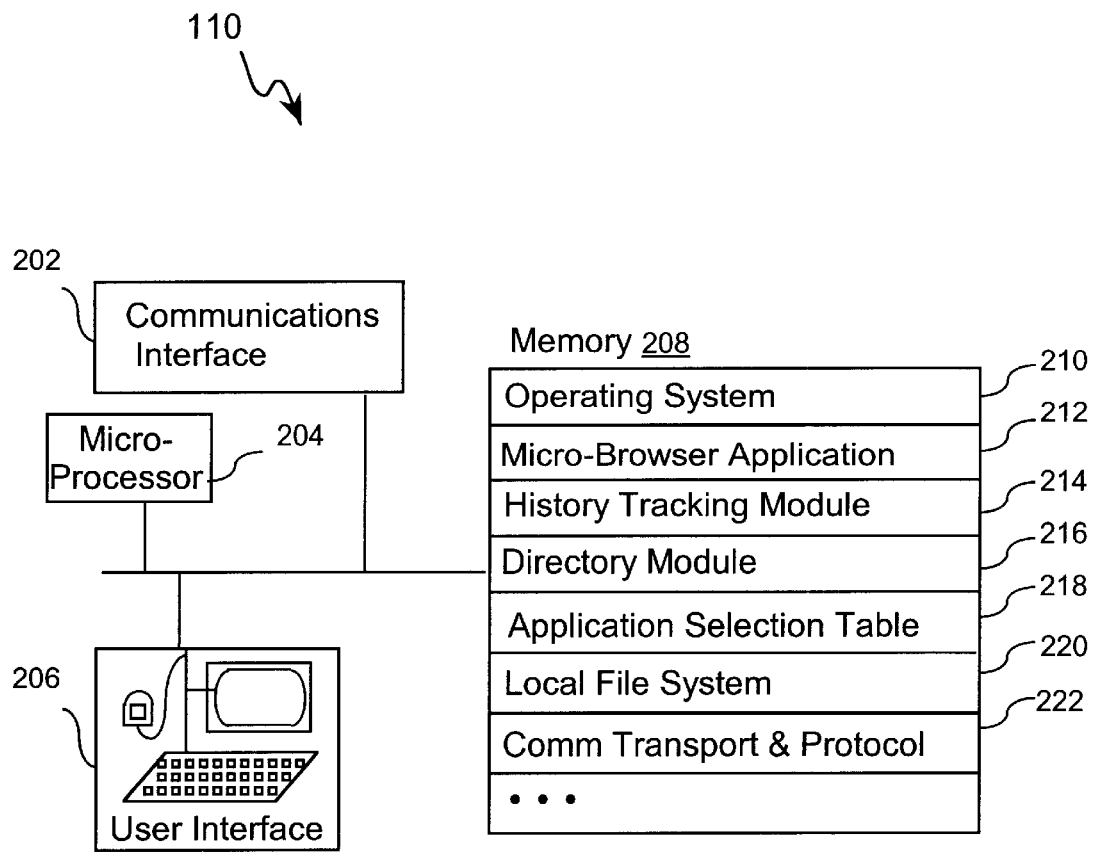
FIG. 2A schematically illustrates an exemplary mobile device in accordance with an embodiment of the invention.

FIG. 2A schematically illustrates an exemplary mobile device 110 in accordance with an embodiment of the invention. The mobile device 110 includes a communications interface 202 for communicating with a network, a microprocessor 204, a user interface, and a memory 208. In an exemplary embodiment, the user interface includes a user input device (e.g., keyboard) and an output device (e.g., screen). The memory 208 includes an operating system 210, a micro-browser application 212, a user operation history tracking module 214 for tracking user operation history, a directory module 216, an application selection table 218, a local file system 220, and a communications transport protocol module 222 for adapting to different transport protocols in the network.

In an exemplary embodiment, the micro-browser application 212 provides a menu that enables keyword-based application search in the network or in the local application selection table 218. For example, the menu may include an application search button and a help button. In one embodiment, when the application search button is selected, an input bar is presented to a user to enter search keywords. A search is performed based on the keywords and the results are displayed to the user. The user can select an application in a list of applications displayed. In one embodiment, each item in the list of applications includes a uniform resource locator (URL) and a brief description of the application. For example, the brief description includes a function description, product promotion, or URLs to other related web pages. In an exemplary embodiment, the user can select an application by browsing the list and highlighting the application or by entering an application number. When an application is selected, it is either uploaded from the local file system 220 or from the gateway 108. The application selection information is tracked by the user operation history tracking module 214 and recorded in the application selection table 218. The directory module 216 defines and maintains the application selection table 218.

Figure 2B:
FIG. 2B schematically illustrates an exemplary application selection table maintained in a mobile device in accordance with an embodiment of the invention.

In an exemplary embodiment, the application selection table 218 includes application selections records that are dynamically updated based on user operation history. In an exemplary embodiment, each application selection record includes various parameters, such as the user inputted keywords (keywords), the name of the selected application (name), the number of times that application was executed (nExec), and the time of the last execution (lastExecTime). An exemplary application selection table 218 is illustrated in FIG. 2B.

In an exemplary embodiment, when a user's request to search for applications is received while the mobile device 110 is disconnected from the gateway 108 (e.g., mobile device out of all service areas), a search in the application selection table 218 is performed instead. In one embodiment, each selected (and executed) application is associated with one or more keywords in the application selection table 218. In another embodiment, these selected applications are continuously monitored by the mobile device 110. In an exemplary embodiment, if a connection to the gateway 108 cannot be established, the directory module 216 begins search in the application selection table 218 using the user provided keywords. For example, the user provided keywords are compared to the keywords associated with each application selection record.

In an exemplary embodiment, bandwidth utilization policies are implemented to allow continuous operations even when the mobile device 110 is disconnected from the gateway 108. For example, for short-lived disconnections, the directory module 216 remains in an active state and will retry periodically to re-connect with the gateway 108. If a connection is established before a time out, the communication between the mobile device 110 and the gateway 108 will resume at the point of previous failure to minimize bandwidth usage. For long-lived disconnections, the directory module 216 terminates the current communication transaction and saves the status of the transaction in the local file system 220. When the mobile device 110 is reconnected to the gateway 108, the communication between the mobile device 110 and the gateway 108 will resume at the point of previous failure based on the transaction status saved in the local file system 220. In an exemplary embodiment, if communication fails during an application search transaction, the search will be automatically redirected from the gateway to the local storage (e.g., the application selection table 218) of the mobile device 110.

Figure 3A:
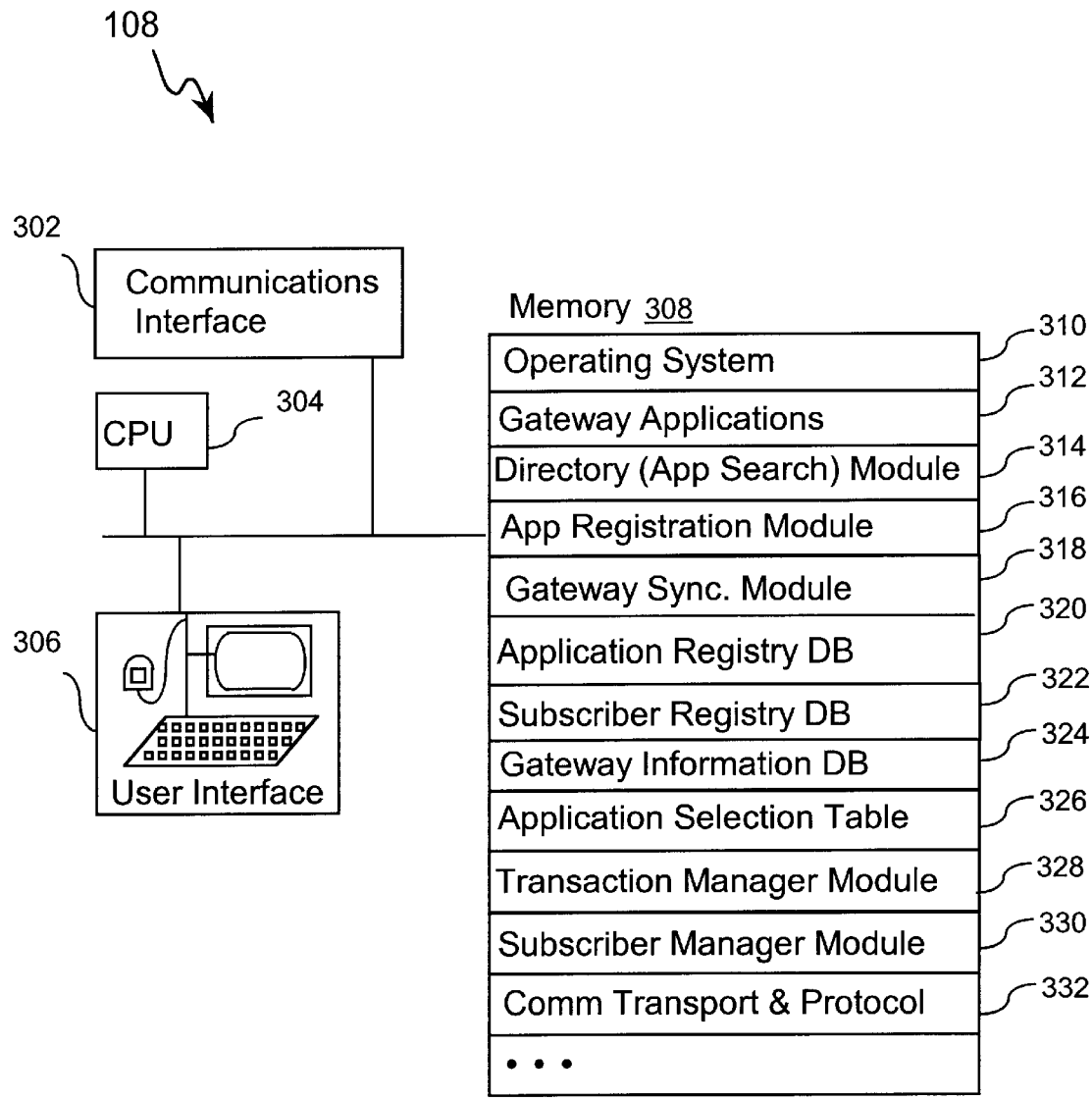
FIG. 3A schematically illustrates an exemplary gateway in accordance with an embodiment of the invention.

FIG. 3A schematically illustrates an exemplary gateway 108 in accordance with an embodiment of the invention. The gateway 108 includes a communications interface 302 for communicating with a network, a CPU 304, a user interface 306, and a memory 308. The memory 308 includes an operating system 310, gateway applications 312, a directory (application search) module 314, an application registration module 316, a gateway synchronization module 318, an application registry database 320, a subscriber registry database 322, a gateway information database 324, an application selection table 326, a transaction manager module 328, a subscriber manager module 330, and a communications transport and protocol module 332. In an exemplary embodiment, the communications transport and protocol module 332 includes transport protocols for communicating with other gateways (e.g., HTTP, file transfer protocol (FTP), simple mail transfer protocol (SMTP), etc.) and with mobile devices (e.g., wireless application protocol (WAP), TCP/IP, HTTP, SMTP, etc.).

The gateway applications 312 include standard gateway applications that are known in the art for performing gateway functions. In an exemplary embodiment, the application registration module 316 collects application registration information from servers or application service providers connected to the network, such as the Internet. In one embodiment, the registration includes an application URL, a brief description of the application, and any assigned keywords for identifying the application. Such registration information is stored in the application registry database 320 via the application registration module 316. Contents in the application registry database 320 in each gateway 108 is synchronized periodically with contents in other gateways. In an exemplary embodiment, such gateway-to-gateway synchronization is triggered and facilitated by the application registration module 316 and the gateway synchronization module 318. The gateway information database 324 includes information about other gateways that is useful for achieving gateway-to-gateway synchronization.

The transaction manager module 328 prevents violations of transaction semantics and data integrity. In one embodiment, the transaction manager module 328 tracks and logs the progress of each transaction, including application search and data synchronization transactions. Transaction tracking also facilitates billing by providing a detailed record of each user's billable activities. The subscriber manager module 330 facilitates registration of user/subscriber IDs into the subscriber registry database 322. In an exemplary embodiment, user requests to the gateway 108 typically includes the user's subscriber ID. That subscriber ID is checked by the subscriber manager module 322 against the subscriber registry database 322 before the requested services are performed.

The application selection table 326 is a database table maintained on gateways 108. Contents of each application selection table 326 is synchronized with application selection tables in other gateways. Generally, the application selection table 326 contains information similar to the mobile application selection table 218, except the gateway application selection table 326 generally may include additional rows listing the associated subscriber IDs and a description for each application selection record. An exemplary application selection table 326 maintained on a gateway 108 is illustrated in FIG. 3B. Further, in an exemplary embodiment, the gateway application selection table 326 maintains selective application information from all users serviced by the gateway 108 and for a longer period of time relative to information stored on mobile devices. The period of maintenance on the gateway application selection table 326 can be an automatic default time or a manually configured time.

Typically, applications searches are performed by the directory module 314 based on contents in the application registry database 320 and the application selection table 326. An exemplary application search is described in FIG. 6 below.

The directory modules 216 and 314 facilitate communications between the mobile device 110 and the gateway 108. In an exemplary embodiment, the directory modules 216 and 314 include a directory protocol as its application layer protocol.

The directory protocol is a family of sub protocols that includes an application search protocol and an application usage upload protocol. The application search protocol searches for a set of matching applications based on keywords provided by a user of a mobile device 110. An exemplary application search protocol process is described in FIG. 7 below.

The application usage upload protocol submits application selection records stored in a mobile device 110 to the gateway 108 that services the mobile device 110. In an exemplary embodiment, validated application selection records in the mobile application selection table 218 are periodically uploaded to the gateway 108, such that the gateway application selection table 326 is kept current. After an application selection record in the mobile device 110 is uploaded to the gateway 108, that application selection record is removed from the application selection table 218. An exemplary application usage upload protocol process is described in FIG. 8 below.

Figure 4A:
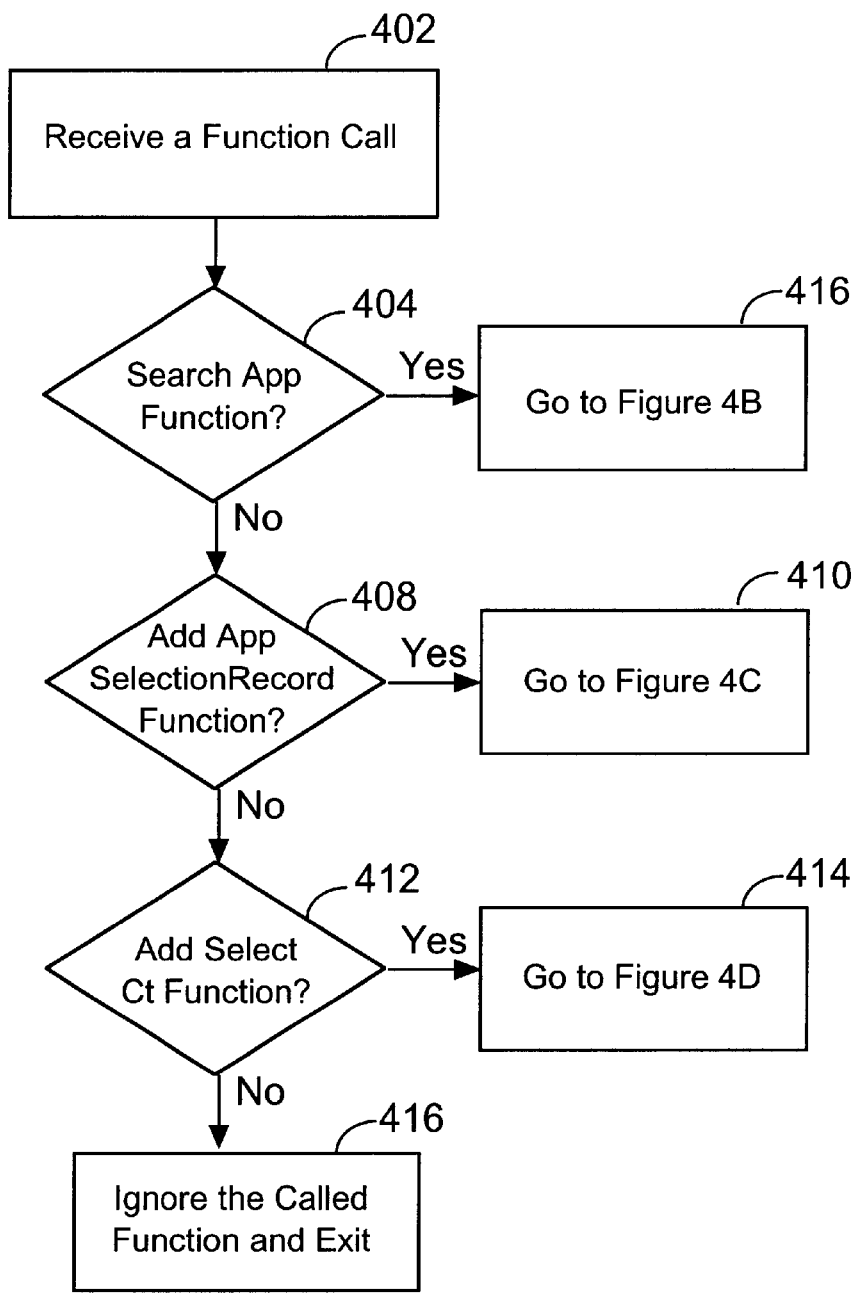
FIGS. 4A–4D illustrate exemplary processes in accordance with an embodiment of the invention.

FIGS. 4A–4D illustrate exemplary processes performed by the mobile device 110 in accordance with embodiments of this invention. In FIG. 4A, the device 110 performs three functions to maintain and update the application selection table 218. At step 402, a function call is received. If the application search function is called (step 404), the process continues in FIG. 4B (step 406). If an add application selection record function is called (step 408), the process continues in FIG. 4C (step 410). If an add select count function is called (step 412), the process continues in FIG. 4D (step 414). Otherwise, the called function is ignored and the process ends (step 416).

Figure 4B:
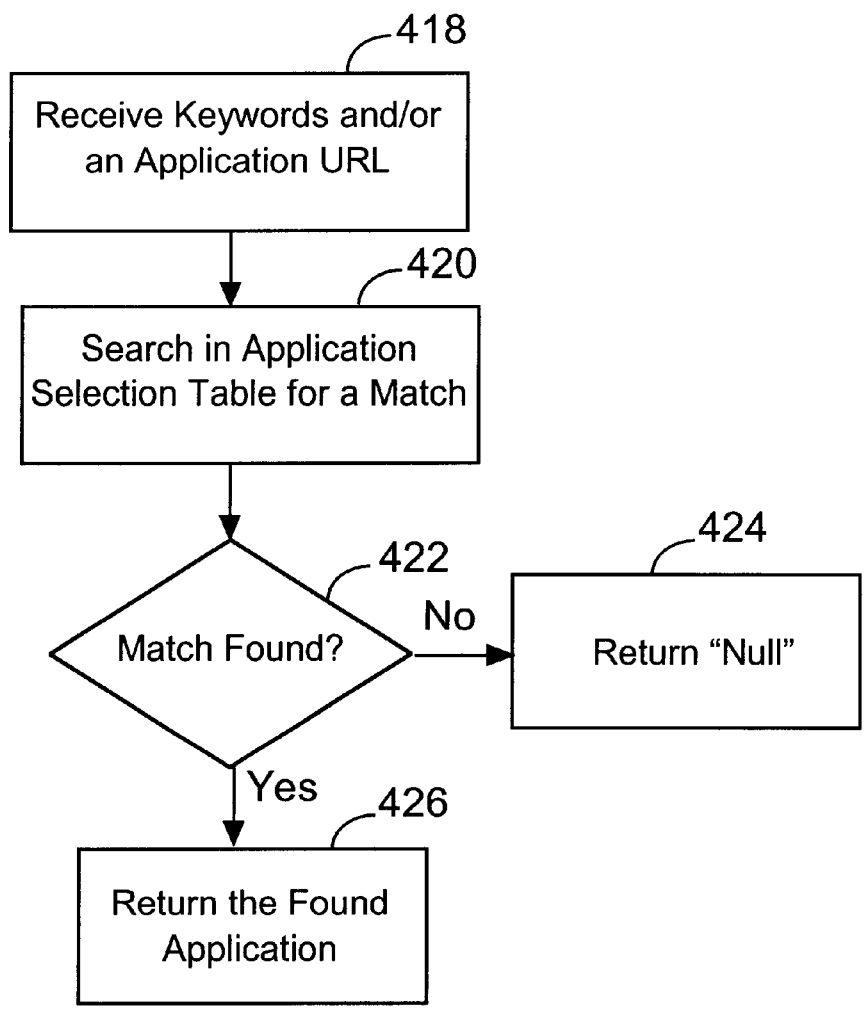

FIG. 4B illustrates an exemplary process when the application search function is called. At step 418, a set of keywords and/or an application URL is received. The application selection table 218 is searched for a match of the keywords or the URL (step 420). If no match is found (step 422), a "null" code is returned (step 424). If a match is found (step 422), the found applications are returned (step 426). In an exemplary embodiment, the found applications may be uploaded from the mobile local file system 220 or remotely.

Figure 4C:
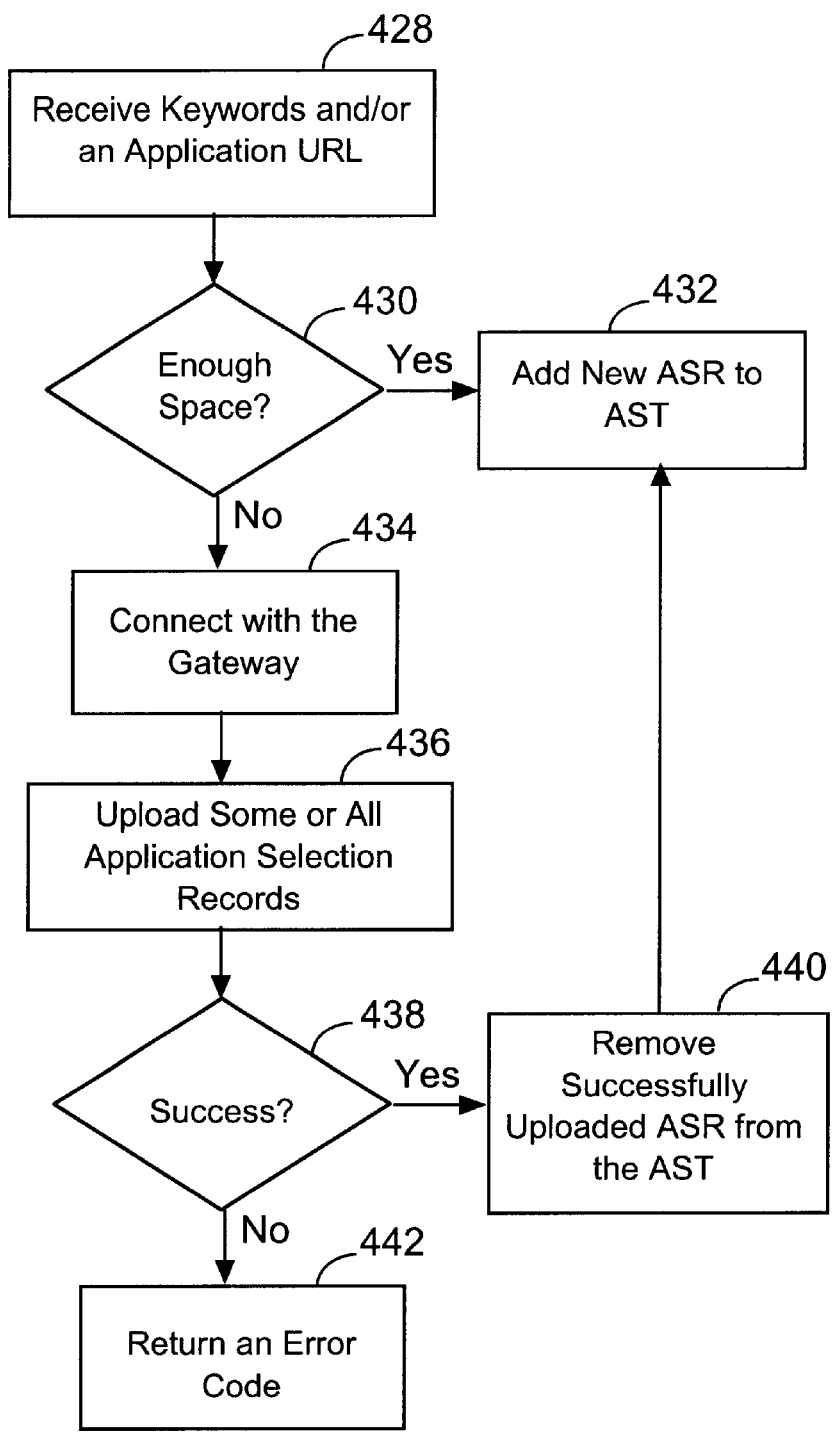

FIG. 4C illustrate an exemplary process when the add application record function is called. At step 428, a set of keywords and/or an application URL representing a new application selection is received. Any free space in the mobile device is determined and compared with the needed space for storing the application selection record (step 430). If there is enough free space, the new application selection record is added to the application selection table (step 432). If there is not enough free space, the device 110 attemps to connect to the gateway (ste 434). If connected, the device 110 uploads some or all application selection records from the device 110 to the gateway (step 438), removes the successfully uploaded application selection records from the mobile application selection record (step 440), and the new application selection record is added to the local application selection table on the device 110 (step 432). If the connection was not successful, an error code is returned and the function fails (step 442).

Figure 4D:
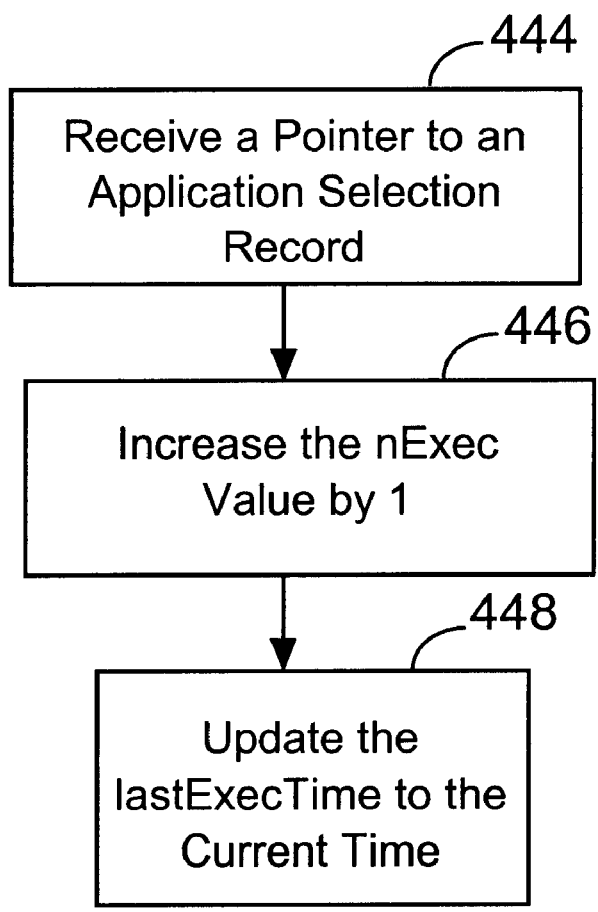

FIG. 4D illustrates an exemplary process when the add select count function is called. At step 444, a pointer to an application selection record is received. Next, the nExec value for that application selection record is increased by 1 (step 446). The lastExecTime value is updated to the current time (step 448).

Figure 5:
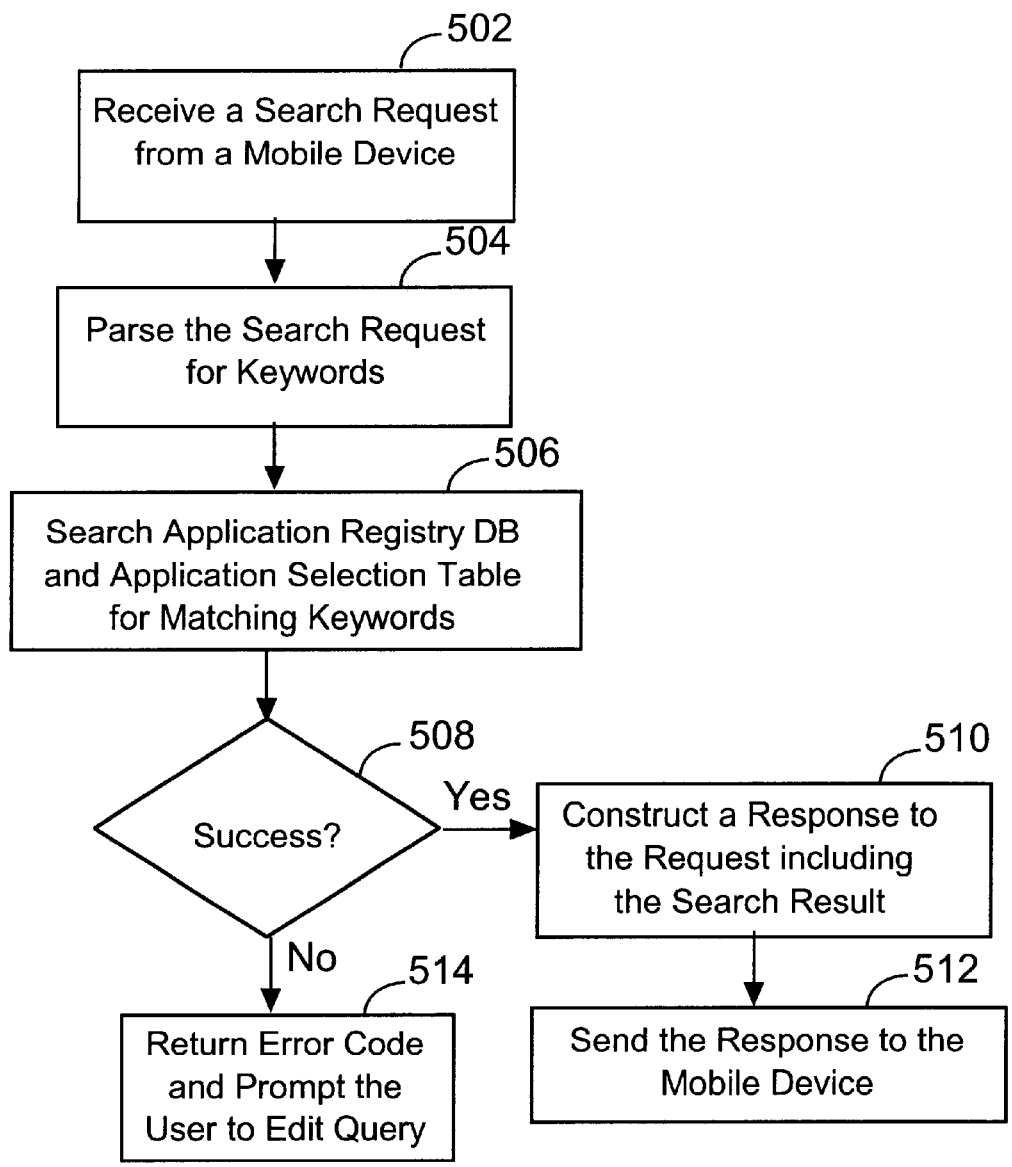
FIG. 5 illustrates another exemplary process in accordance with an embodiment of the invention.
Figure 6:
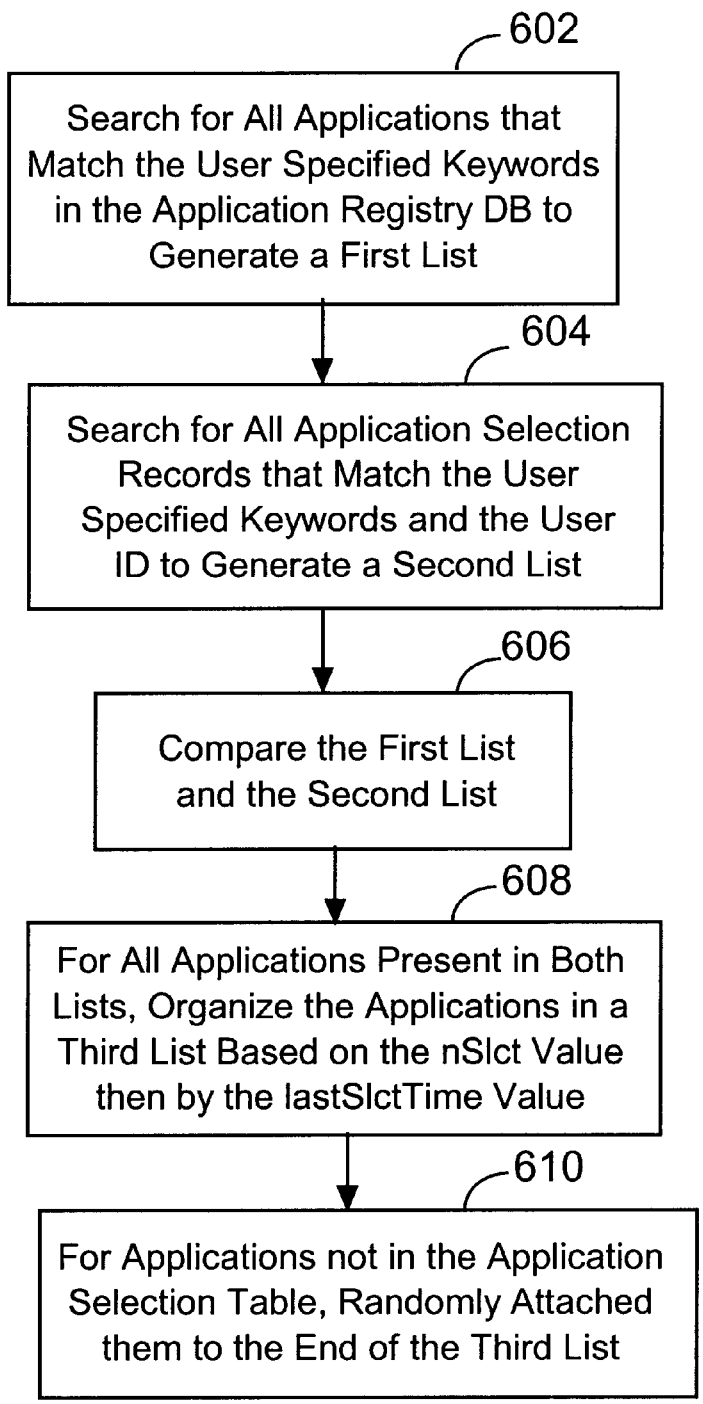
FIG. 6 illustrates another exemplary process in accordance with an embodiment of the invention.

FIG. 5 illustrates an exemplary process performed by the gateway 108 in accordance with an embodiment of the invention. At step 502, the gateway 108 receives a search request from a mobile device. In an exemplary embodiment, the search request includes user specified keywords. In one embodiment, the search request also includes the user or subscriber ID. The search request is parsed for any keywords (step 504). The application registry DB 320 and the application selection table 326 are searched for any applications matching the keywords (step 506). If the search was successful (step 508), a response is constructed based on the search result (step 510). FIG. 6 below illustrates an exemplary process to organize search result applications. The response is sent to the mobile device (step 512). Referring back to step 508, if the search in step 506 is unsuccessful (i.e., no matching application is found), an error code is returned to the mobile device and the user may be prompted to revise the keyword query (step 514).

FIG. 6 illustrates an exemplary application search process performed by the gateway 108 in accordance with an embodiment of the invention. At step 602, the application registry DB 320 is searched for any matching application to the user specified keywords; all matching applications are included in a first list of applications. Next, the application selection records, which are associated with the user's ID in the application selection table 326, are searched for any matching application to the user specified keywords; all matching applications are included in a second list of applications (step 604). The first list of applications is compared to the second list of applications (step 606). Applications present in both the first and the second lists are selected sorted first in decreasing order of the nExec parameters and then in decreasing order of the lastExecTime parameters, such ordered applications are placed in a third list of applications (step 608). For example, an application having a higher nExec parameter value has a higher position in the third list than an application having a lower nExec parameter value. Similarly, among applications having the same nExec values, the application having the most recent lastExecTime has a higher position on the third list than other applications. For example, if both applications A and B are selected 3 times, but application A was more recently selected than application B, then application A has higher priority on the third list than application B. Applications that are not present in both the first and second lists are randomly attached to the end of the third list (step 610). Thus, the third list contains applications in the descending order of frequency of use by the user based on the user's past preferences.

Figure 7:
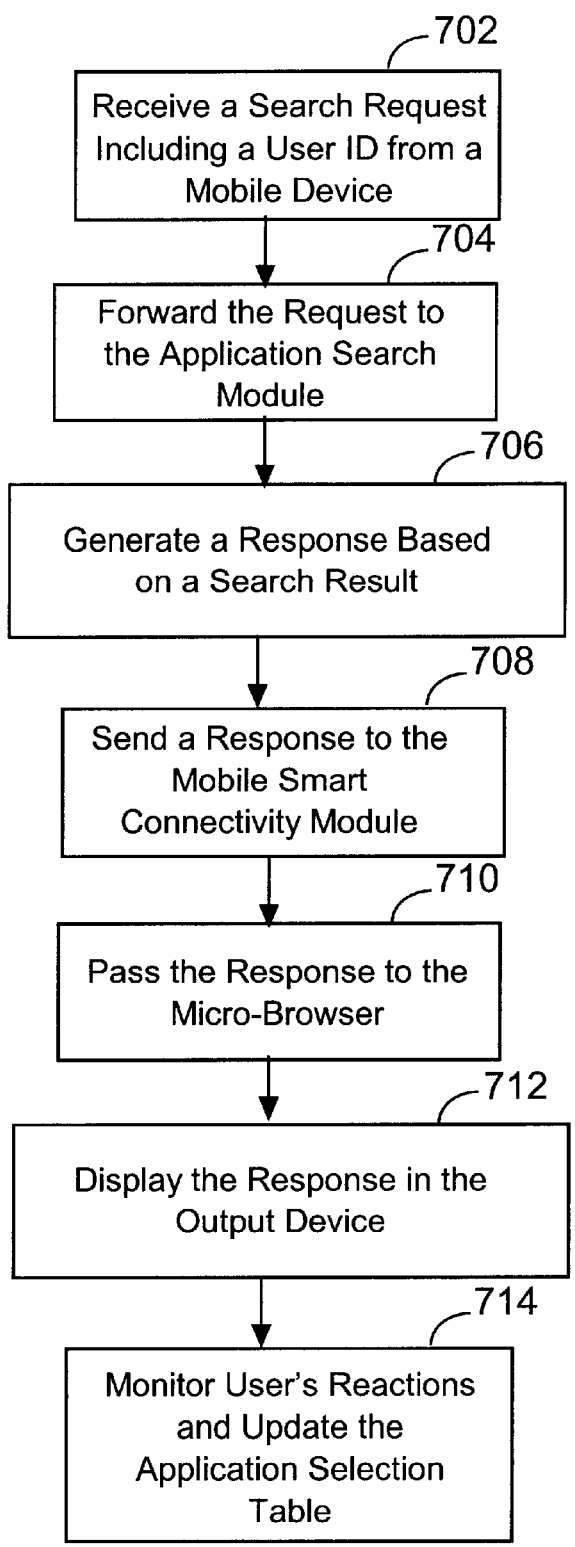
FIG. 7 illustrates another exemplary process in accordance with an embodiment of the invention.

FIG. 7 illustrates an exemplary application search protocol process performed by the directory modules 216 and 314 in accordance with an embodiment of the invention. At step 702, a search request sent by a mobile device 110 is received by the gateway 108. At the gateway 108, the message is forwarded to the application search module 314 (step 704). After the search is completed by the application search module 314, a response is generated and sent to the directory module 216 in the mobile device 110 (step 708). In an exemplary embodiment, the response includes the number of matching applications, the URLs for those applications, a brief description of each application, and assigned keywords for each application. After the mobile directory module 216 received the response, it passes the response to the micro-browser 212 (step 710). The micro-browser 212 then displays the results to the user via the output device 206 (step 712). Further, the micro-browser 212 monitors the user's reactions and updates the application selection table 218 accordingly (step 714).

Figure 8:
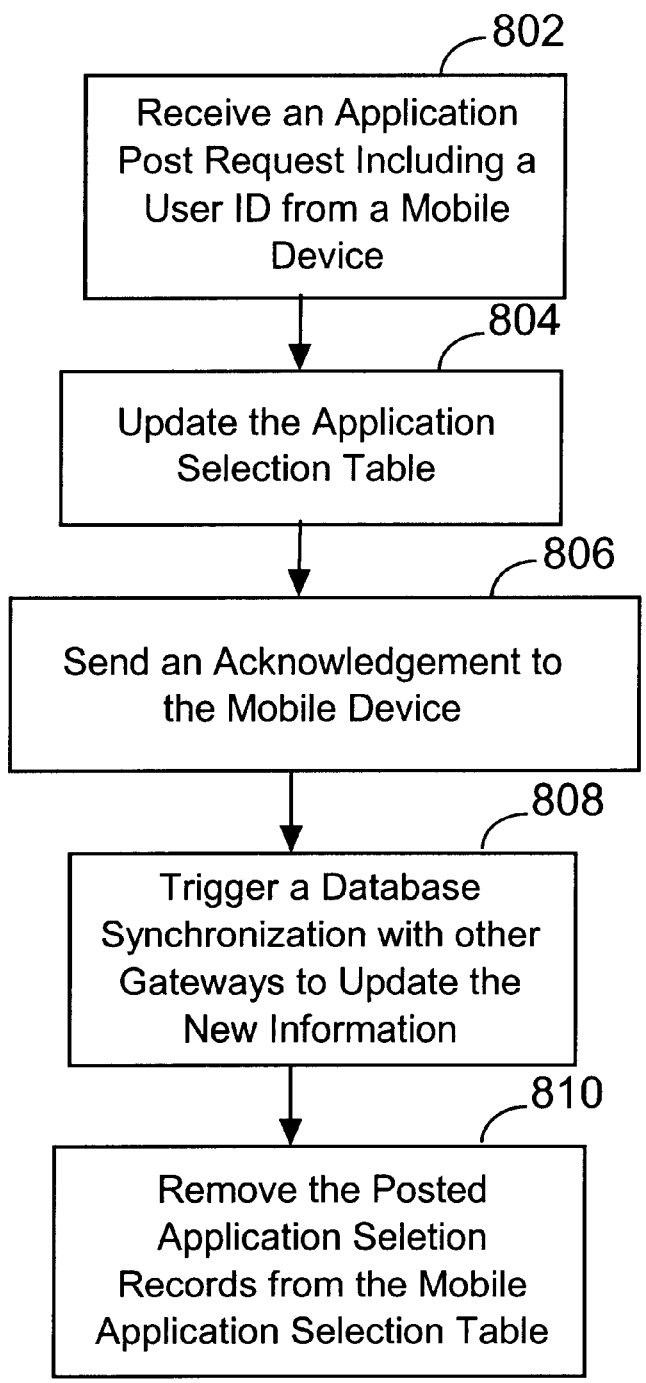
FIG. 8 illustrates another exemplary process in accordance with an embodiment of the invention.

FIG. 8 illustrates an exemplary application usage upload protocol process performed by the directory modules 214 and 314 in accordance with an embodiment of the invention. At step 802, an application post request sent by the mobile device 110 is received by the gateway 108. In an exemplary embodiment, the post request includes a user ID and an array of application selection records from the application selection table 218 of the mobile device 110. At the gateway 108, the directory module 314 updates the application selection table 326 (step 804). The directory module 314 sends an acknowledgment message back to the mobile device 110

(step 806). At an appropriate time (e.g., when the network is least congested), the directory module 314 triggers and facilitates database synchronization with other gateways to update the application selection tables (step 808). After receiving the acknowledgment from the gateway 108, the directory module 216 at the mobile device 110 removes that array of application selection records that were successfully posted at the gateway 108 (step 810).

The foregoing examples illustrate certain exemplary embodiments of the invention from which other embodiments, variations, and modifications will be apparent to those skilled in the art. The invention should therefore not be limited to the particular embodiments discussed above, but rather is defined by the claims.

What is claimed is:

1. A method for providing personalized application search results in a mobile device, comprising the steps of:

receiving a search request from a user, said search request including at least one search keyword and a user identifier;

searching an application registry database for a first set of matching applications based on said at least one search keyword;

searching an application selection table for a second set of matching applications based on said at least one search keyword and said user identifier;

ordering said second set of matching applications based on frequency of use parameters in said application selection table to obtain an ordered second set of matching applications;

appending a set of applications that are included in said first set of matching applications but not included said second set of matching applications to the end of said ordered second set of matching applications to obtain a third set of matching applications;

generating a response to said search request based on the said third set of matching applications, and sending said response to said user.

2. The method of claim 1, further comprising the steps of:

collecting application registration information for each application, said application registration information including:
 a uniform resource locator;
 a brief description; and
 at least one associated keyword; and storing said application registration information in said application registry database.

3. The method of claim 1, further comprising the steps of:

receiving application selection records from said user, each of said application selection records including:
 a uniform resource locator;
 at least one associated keyword;
 parameter values indicating a frequency of use; and
 a time stamp indicating a last use of an application; and storing said application selection records in said application selection table.

4. A computer program product for providing personalized application search results in a mobile device, comprising:

logic code for receiving a search request from a user, said search request including at least one search keyword and a user identifier;

logic code for searching an application registry database for a first set of matching applications based on said at least one search keyword;

logic code for searching an application selection table for a second set of matching applications based on said at least one search keyword and said user identifier;

logic code for ordering said second set of matching applications based on frequency of use parameters in said application selection table to obtain an ordered second set of matching applications;

logic code for appending a set of applications that are included in said first set of matching applications but not included said second set of matching applications to the end of said ordered second set of matching applications to obtain a third set of matching applications;

logic code for generating a response to said search request based on said third set of matching applications; and logic code for sending said response to said user.

5. The computer program product of claim 4, further comprising:

logic code for collecting application registration information for each application, said application registration information including:
 a uniform resource locator;
 a brief description; and
 at least one associated keyword; and logic code for storing said application registration information in said application registry database.

6. The computer program product of claim 4, further comprising:

logic code for receiving application selection records from said user, each of said application selection records including:
 a uniform resource locator;
 at least one associated keyword;
 parameter values indicating a frequency of use; and
 a time stamp indicating a last use of an application; and logic code for storing said application selection records in said application selection table.

* * * * *